US012764219B2

(12) United States Patent
McEvoy et al.

(10) Patent No.: US 12,764,219 B2
(45) Date of Patent: Oct. 13, 2026

(54) SMART PAPER OR SHEET TO LINK AN ELECTRONIC DEVICE HAVING A DISPLAY AND USER INTERFACE TO ANOTHER ELECTRONIC DEVICE

(71) Applicant: JT International SA, Geneva (CH)

(72) Inventors: Jaakko McEvoy, Vienna (AT); Christoph Lungenschmied, Vienna (AT); Bernhard Groiss, Vienna (AT)

(73) Assignee: JT International SA, Geneva (CH)

( * ) Notice: Subject to any disclaimer, the term of this patent is extended or adjusted under 35 U.S.C. 154(b) by 148 days.

(21) Appl. No.: 18/683,039

(22) PCT Filed: Aug. 12, 2022

(86) PCT No.: PCT/IB2022/057550
§ 371 (c)(1),
(2) Date: Feb. 12, 2024

(87) PCT Pub. No.: WO2023/017479
PCT Pub. Date: Feb. 16, 2023

(65) Prior Publication Data

US 2024/0357030 A1 Oct. 24, 2024

(30) Foreign Application Priority Data

Aug. 13, 2021 (EP) .................................... 21191411

(51) Int. Cl.
*H04M 1/72412* (2021.01)
*A24F 40/53* (2020.01)
(Continued)

(52) U.S. Cl.
CPC ......... *H04M 1/72412* (2021.01); *A24F 40/53* (2020.01); *A24F 40/65* (2020.01); *H04B 5/43* (2024.01); *H04B 5/79* (2024.01)

(58) Field of Classification Search
CPC ....... H04M 1/72412; H04B 5/43; H04B 5/79; H04L 67/34; A24F 40/53; A24F 40/65;
(Continued)

(56) References Cited

U.S. PATENT DOCUMENTS 10,789,524 B2 9/2020 Lotya et al.
12,174,768 B2 * 12/2024 Wu .................... G06F 13/4282
(Continued)

FOREIGN PATENT DOCUMENTS

GB 2533137 A 6/2016
JP 2013512518 A 4/2013
(Continued)

OTHER PUBLICATIONS

International Search Report for PCT/IB2022/057550 mailed Nov. 8, 2022. 3 pgs.

*Primary Examiner* — Adnan Aziz
(74) *Attorney, Agent, or Firm* — Lerner David LLP

(57) ABSTRACT

A sheet having a front surface and a rear surface is configured for linking a first electronic device with a second electronic device, and includes a first communication device for wirelessly connecting to the first electronic device, a second communication device for wirelessly connecting to the second electronic device, at least one switch element operatively connected to the first communication device or the second communication device, and a data communication link between the first communication device and the second communication device.

20 Claims, 7 Drawing Sheets

(51) Int. Cl.
*A24F 40/65* (2020.01)
*H04B 5/43* (2024.01)
*H04B 5/79* (2024.01)

(58) Field of Classification Search
CPC ............. G06K 7/10009; G06K 19/025; G06K 7/10178
See application file for complete search history.

(56) References Cited

U.S. PATENT DOCUMENTS

2007/0008140 A1 1/2007 Saarisalo et al.
2009/0023475 A1* 1/2009 Chang ............... H04M 1/72409 455/557
2010/0194335 A1* 8/2010 Kirby ...................... H02J 50/90 320/108
2010/0201533 A1* 8/2010 Kirby .................... H02J 7/0047 320/108
2012/0112539 A1* 5/2012 Yamamoto ............. H02J 50/80 307/104
2012/0248186 A1 10/2012 Chauvet
2015/0224268 A1* 8/2015 Henry ..................... A24F 40/90 128/202.21
2016/0180210 A1 6/2016 Spears
2016/0380467 A1* 12/2016 Shao ....................... H02J 50/80 320/108
2017/0040815 A1* 2/2017 Todasco .................. H02J 7/005
2017/0133881 A1* 5/2017 Cho ...................... H02J 7/0042
2017/0272316 A1* 9/2017 Johnson .............. H04W 12/068
2018/0286208 A1 10/2018 Baker et al.
2018/0351379 A1* 12/2018 Garbus ................. H02J 7/0048
2019/0158353 A1* 5/2019 Johnson .............. H04L 63/0823
2020/0125917 A1 4/2020 Besnier et al.
2020/0358480 A1* 11/2020 Pickering ............... H04B 5/263
2021/0226668 A1* 7/2021 Cordier .................... H01Q 3/24
2021/0287562 A1* 9/2021 Amir ...................... G09B 5/062
2021/0386125 A1* 12/2021 Kilger ..................... A24F 40/42
2022/0415569 A1 12/2022 Irie et al.
2023/0356072 A1 11/2023 Hiura et al.

FOREIGN PATENT DOCUMENTS

JP 2015069470 A 4/2015
JP 2020184368 A 11/2020
JP 2021087044 A 6/2021
WO 2021100517 A1 5/2021

* cited by examiner

SMART PAPER OR SHEET TO LINK AN ELECTRONIC DEVICE HAVING A DISPLAY AND USER INTERFACE TO ANOTHER ELECTRONIC DEVICE

CROSS-REFERENCE TO RELATED APPLICATIONS

The present patent application is a national phase entry under 35 U.S.C. § 371 of International Application No. PCT/IB2022/057550, filed Aug. 12, 2022, published in English, which_claims priority to the European Patent Application No. EP21191411.4 that was filed on Aug. 13, 2021, the entire contents thereof are herewith incorporated by reference in their entireties.

FIELD OF THE INVENTION

The present invention is directed to the field of sheets or substrates having an electric circuit therein, for example a printed sheet, paper, card, or foil, or film having an electric circuit for interconnecting with external electronic devices having marketing or sales information printed thereon, more particularly, a printed sheet, paper, or foil capable of wirelessly interconnecting a smart phone with another electronic device.

BACKGROUND

In the field of disposable or non-disposable sheets having an electronic circuit for wireless interconnection with external electronic devices, different solutions have been proposed. For example U.S. Patent Publication No. 2020/0125917 is directed to a printed item that includes near-field communication (NFC) antennas, NFC chips, and switches that can be manually operated to activate one or more of the NFC chips. Upon activation of the NFC chips by one of the switches, the NFC chips can transmit a signal to another NFC-enabled data communication device, for example an NFC-enabled smart phone that is placed on the printed item, to call up data information or a link at the NFC-enabled smart phone.

In the field of radio frequency identification (RFID) smart cards, U.S. Pat. No. 10,789,524 describes a smart card (SC) having card body having two electronic modules that can communicate with each other via two or more coupler coils, and a booster antenna to receive energy from an external device. It is further explained that there is no hardwire connection present between the modules of the smart card. In this respect, this patent has the goal to provide for several electronic modules inside a single smart card without a wired interconnection, to provide for a more reliable interconnection for example for cases where the smart card has been subject to repeated bending that could have torn or interrupted the wired interconnections.

Also in the field of electronic security devices, particularly contactless smart chip devices for example a wireless key or a wireless entry card, U.S. Patent Publication No. 2016/0180210 describes a push-button enabled contactless transmitting device using a plurality of smart chips that can wirelessly communicate by RFID or NFC. The push buttons can be selectively activated by a user pressing an area on substrate that is marked where the push button is located, for example on a top surface of the device, to activate a selected one of the chips, such that a code information can be sent to a remote electronic reader device via the wireless connection.

However, in the field of sheets or thin substrates having one or more electric circuit therein for wireless interconnection with external devices, improved solutions are desired, for example to provide for applications allowing for communication and interconnection between multiple external devices, particularly for establishing a wireless communication interface for different types of electronic devices for improved customer experience and marketing communication.

SUMMARY

According to one aspect of the present invention, a sheet having a front surface and a rear surface is provided. Preferably, the sheet is configured for linking a first electronic device having a user interface with a second electronic device. The sheet preferably includes a first communication device for wirelessly connecting to the electronic device, a second communication device for wirelessly connecting to the electronic cigarette, at least one switch element operatively connected to the first communication device or the second communication device, and a data communication link between the first communication device and the second communication device.

According to another aspect of the present invention, a system is provided, permitting to link a first electronic device with a second electronic device. Preferably, the system includes a sheet having a front surface and a rear surface, a first electronic device having a display, and a second electronic device, for example an electronic cigarette. Moreover, preferably, the sheet includes a first communication device for wirelessly connecting to the first electronic device, a second communication device for wirelessly connecting to the second electronic device, at least one switch element operatively connected to the first communication device or the second communication device, and a data communication link between the first communication device and the second communication device.

According to still another aspect of the present invention, a method for writing or reading information between a first electronic device and a second electronic device, for example an electronic cigarette, via a sheet is provided. Preferably, the sheet includes a first communication device for wirelessly connecting to the first electronic device, a second communication device for wirelessly connecting to the second electronic device, and a data communication link for communicating between the first and second communication devices. Moreover, preferably, the method includes the steps of placing the first and the second electronic device onto the sheet, pressing a switch of the sheet to launch an application software on the first electronic device via the first communication device, pressing a switch of the sheet to trigger a data transfer from the first electronic device to the second electronic device via the data communication link, or pressing a switch to trigger a data transfer from the second electronic device to the first electronic device via the data communication link.

According to still another object of the present invention, a sheet having a front surface and a rear surface is provided, the sheet being configured for wirelessly linking to at least one electronic device The sheet may comprise a first communication device and a second communication device, wherein at least one of the first or second communication devices are configured for wirelessly connecting to the at least one electronic device. In addition, at least one switch element is operatively connected to the first communication device or the second communication device and a bidirectional data communication link between the first communication device and the second communication device.

The above and other objects, features and advantages of the present invention and the manner of realizing them will become more apparent, and the invention itself will best be understood from a study of the following description with reference to the attached drawings showing some preferred embodiments of the invention.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

Herein, identical reference numerals are used, where possible, to designate identical elements that are common to the figures. Also, the images are simplified for illustration purposes and may not be depicted to scale.

DESCRIPTION OF THE SEVERAL EMBODIMENTS

Figure 1A:
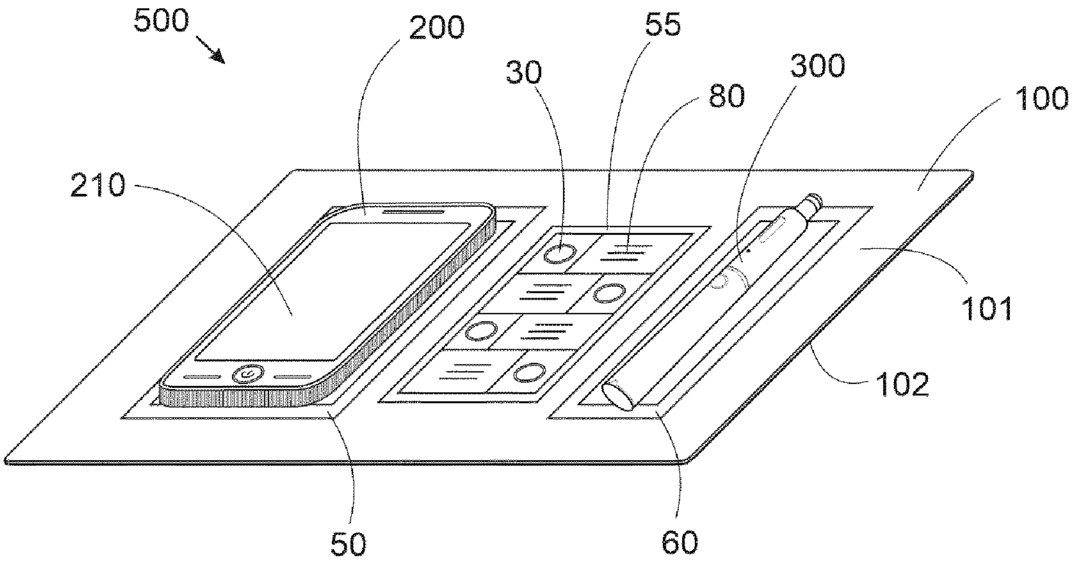
FIGS. 1A-1E shows different views of an exemplary and simplified electronic device 100, for example embodied as a substrate, sheet, paper, card, or foil 100 having a first and second communication device 10, 20 for wirelessly connecting to different electronic devices 200, 300, respectively, with FIG. 1A shown a top perspective view of device 100 with a first electronic device 200, for example a smart phone, and second electronic device 300, for example but not limited to an electronic aerosol-generation device such as an electronic cigarette or Heat-not-burn device, placed thereon, showing system 500, FIG. 1B showing a top transparent view for illustrating some elements of device 100, FIG. 1C showing a simplified view of the electronic circuitry of the device 100, with FIG. 1D showing an external top surface with graphical and text elements 50, 55, 60, printed or otherwise provided thereon, and FIG. 1E showing a simplified view of another embodiment of the electronic circuitry of the device or sheet 100 having a centrally-arranged microcontroller 99.
Figure 1B:
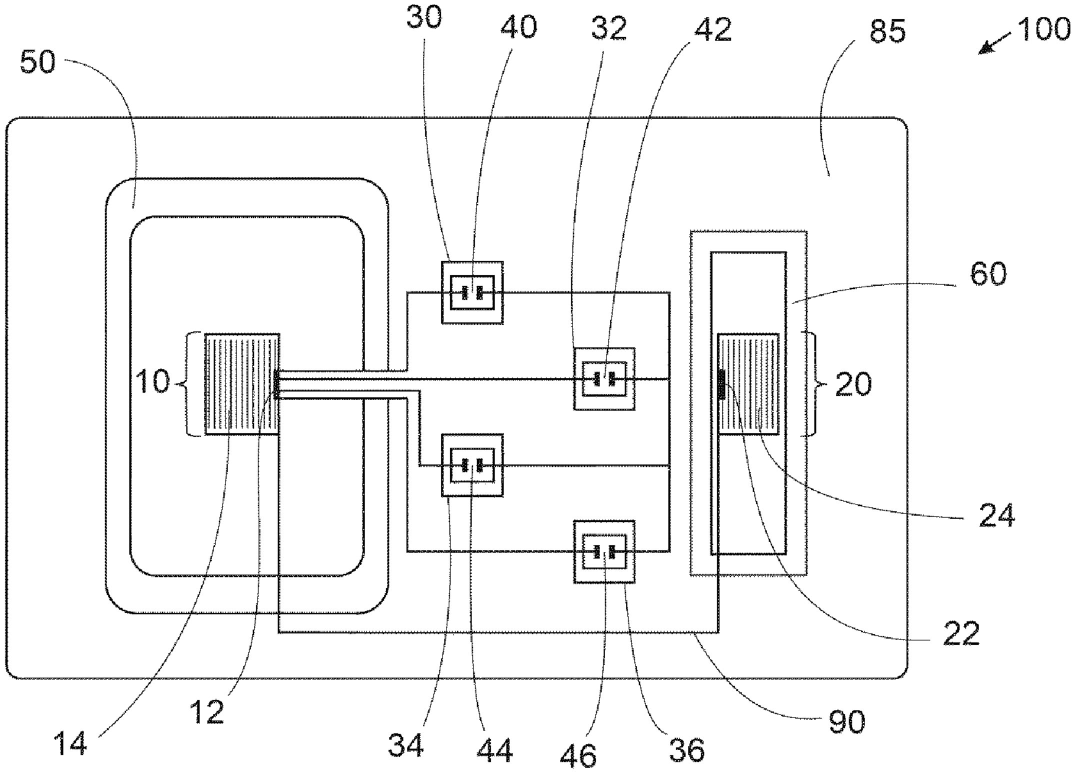

FIG. 1A shows an exemplary top perspective view of the device or sheet 100, for example a printed sheet, paper, card, or foil, or film 100, with a first electronic device 200 having user interface 210, for example a smart phone 200 having a touch-sensitive display screen 210, and second electronic device 300, for example an electronic aerosol-generation device 300 such as but not limited to an electronic cigarette or Heat-not-burn device, placed at specific locations on an upper surface of device 100. Device or sheet 100, with first and second electronic devices 200, 300 is referenced herein as an electronic system 500. Device or sheet 100 can be made to be flexible, rollable, bendable, even foldable, for example but not limited to a sheet of paper, cardboard, foil, laminate, or other types of preferably flexible substrates. For example, sheet 100 can have thickness of less than 1 mm. Upper or front surface 101 of device 100 includes a first graphical element 50 designating, suggesting, or otherwise indicating a location where first electronic device 200 can be placed onto upper or front surface 101 of device or sheet 100, for example arranged at the left side. This placement location for device 200 at first graphical element 50 can guarantee the possibility of a wireless or contactless communication between first electronic device 200 and device or sheet 100. Graphical element 50 can have the appearance be a rectangular box having dimensions that are substantially similar to an outline of the most commonly used smartphones, for example having in a range of between of 5 cm to 9 cm, and having a length in a range between 11 cm to 16 cm. Other types of graphical elements 50 are also possible, for example but not limited to a stylized image of a smart phone, a symbol, a logo, a shading or print having a rectangular shape.

Moreover, second graphical element 60 designating, suggesting, or otherwise indicating a location where second electronic device 300 is to be placed onto upper surface 101 of device or sheet 100, in the variant shown on the right side, providing for a rectangular box that represents an outline of an electronic cigarette, indicating a placement for an electronic cigarette, or other type of second electronic device 300. This placement location for device 300 at second graphical element 60 can guarantee the possibility of a wireless or contactless communication between second electronic device 300 and device or sheet 100. For example, second graphical element 60 can be a graphical representation of an electronic cigarette, can be a rectangular box or shading in an upright position.

In addition, a third graphical element 55 is arranged, in the variant shown between first and second graphical elements 50, 60, the third graphical element 55 including graphical elements 30, 32, 34, 36 representing different areas for activation of a push or sensing button or switch 40, 42, 44, 46, respectively. In the variant shown, four (4) such areas are shown representing four different push or sensing buttons 40, 42, 44, 46, but other numbers are also possible. Moreover, for example being part of third graphical element 55, different descriptive or informative graphical elements are shown, for example different text element 80, 82, 84, 86 viewable on the front surface 101 of sheet 100. Descriptive graphical elements, for example text element 80, 82, 84, 86 can be visually or graphically associated with the at least one switch elements 40, 42, 44, 46, to provide for a description, instruction, or context for a user U that is associated with an action that will be performed when user U activates a respective one of switch elements 40, 42, 44, 46.

For example, descriptive elements 80, 82, 84, 86 could provide for instructions to the user in the form of a readable text, instructive cartoons, infograms, or other graphics that indicates that the activation of the associated switch 40, 42, 44, 46 can provide for a function that involves first electronic device 200, second electronic device 300, or both 200, 300, for example but not limited to starting an application software on the first electronic device 200, preferably a pre-installed application on smart phone 200 as the first electronic device 200, transferring data from first to second electronic device 200, 300 or vice versa, displaying media or other data on display 210 of first electronic device 200. For example, to active switch 40, user U would have to place is finger onto an area designated by graphical element 30 that is part of third graphical element 55. Graphical elements 30, 32, 34, 38 can be embodied but are not limited to a circle, an oval, a square, a graphical representation of a bush button, a keyboard button, or other type of finger-activated switch, an icon, smiley, emoticon, ideogram, a logo.

The different graphical elements 50, 55, 60 and other graphical elements can be provided onto sheet 100 by different means, for example by printing, by a pre-printed laminate layer that is placed onto sheet 100, for example by using a digital ink jet printer, screen printing techniques, flexography printing, UV lithography printing, pad printing, laser printing. It is also possible that graphical elements 50, 55, 60 are three-dimensionally printed to have some structure or depth, for example the graphical elements 30, 32, 34, 36 representing different areas that can appear as a user-activatable button or switch. It is also possible that part or a top layer of sheet 100 is embossed with structurations, or etched to form indentations, or is decorated with stickers that represent the different graphical elements 50, 55, 60, or are provided with a combination of the above printing and marking techniques.

Figure 1C:
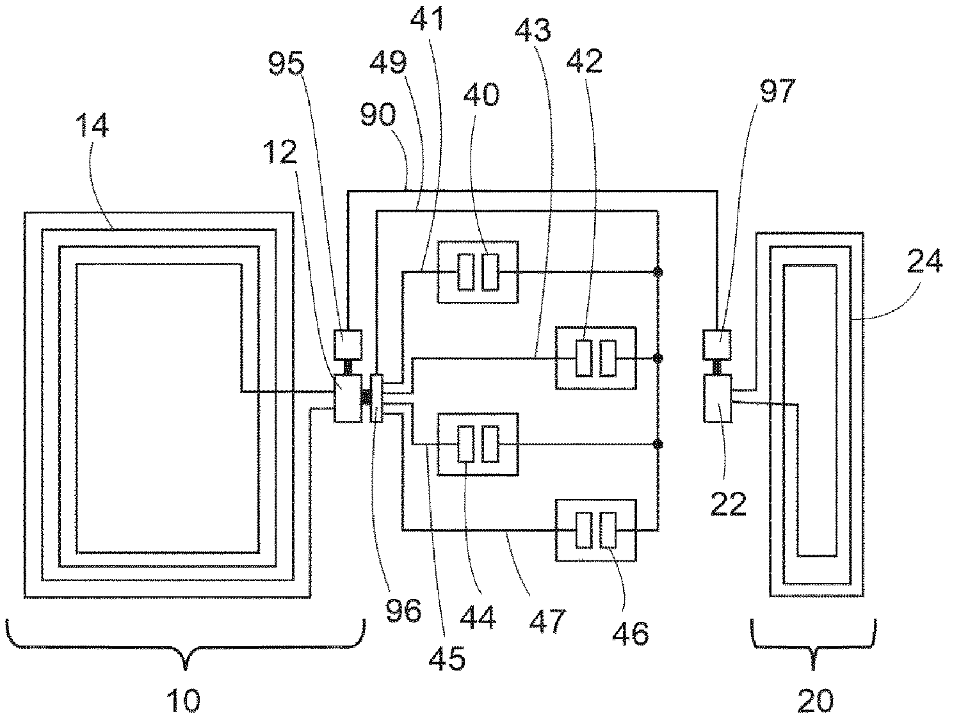
Figure 1D:
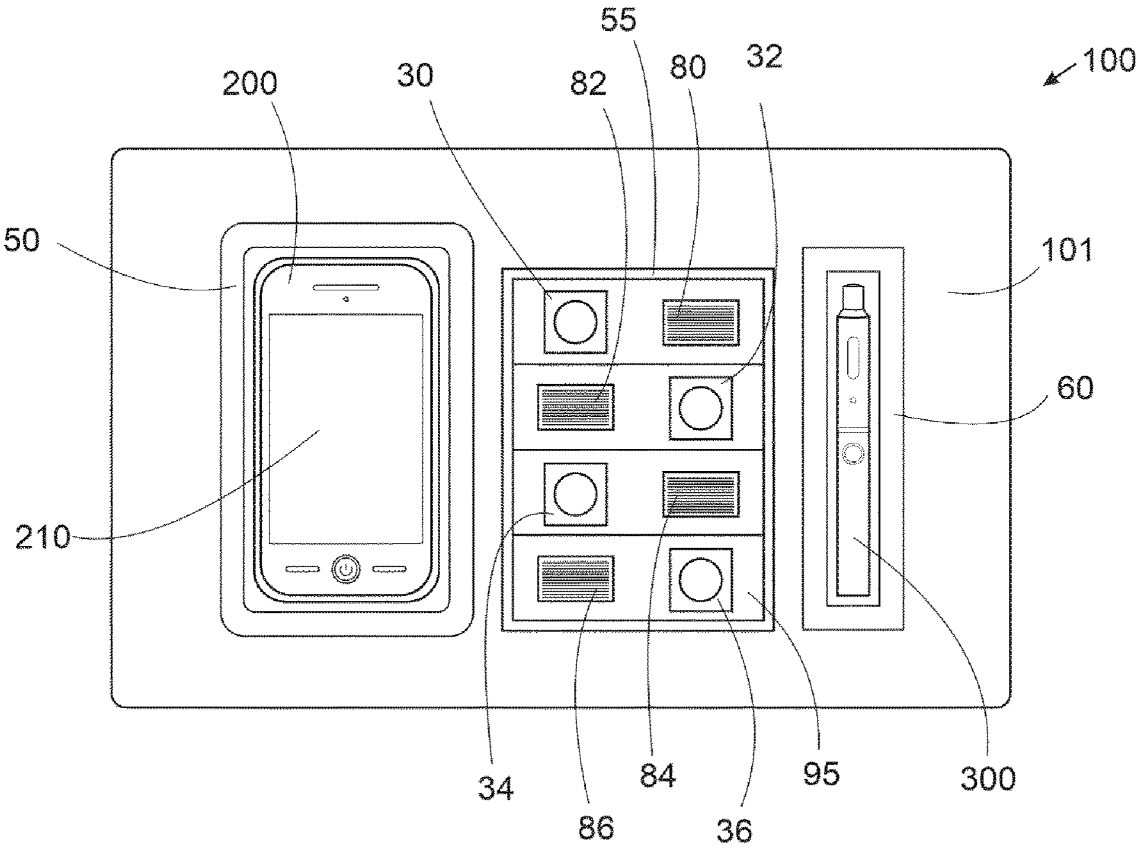

FIG. 1C shows a simplified, exemplary view of the electronic circuitry of the device 100, exemplarily showing on the left side a first communication device 10 including an NFC antenna 14, for example an antenna coil, an NFC communication chip 12, and on the right side a second communication device 20 including an NFC antenna 24, for example an antenna coil, an NFC communication chip 22. NFC antenna 14 has a layout of the coil or windings such that it allows to interconnect with an RF field of NFC antenna of first electronic device 200, typically a smartphone, and NFC antenna 24 has a layout of the coil or windings such that it allows to interconnect with an RD field of NFC antenna of second electronic device 300, in an example an electronic cigarette. Moreover, each one of the first and second communication devices 10, 20 can include additional elements, for example but not limited to antenna matching impedances, power rectifiers, voltage regulators, power converters, and other elements needed for the NFC communication.

Moreover, first and second communication devices 10, 20 are operatively interconnected to each other with a data communication link 90, for example including a first data communication transceiver 95 that is operatively interconnected with NFC communication chip 12, and a second data communication transceiver 97 that is operatively interconnected with NFC communication chip 22, data communication link 90 and the transceivers 95, 97 can use different types of data protocols and transmission modes, for example but not limited to a Universal Serial Bus (USB), $I^2C$, CAN bus, RS-232, RS-485, Firewire IEEE 1394, TTL signals, Serial Peripheral Interface (SPI). Preferably, the transmission mode of transceivers 95, 97, and data communication link 90 is a wired connection using very low power consumption, but it is also possible that a wireless communication is provided between transceivers 95, 97, for example but not limited to a Bluetooth connection.

The NFC communication chips 12, 22, and antennas 14, 24 are preferably such that they can be operated passively, being fed with wireless power from a respective external device via inductive coupling, for example by the use of loop antennas as antennas 14, 24 forming an air-core transformer, thereby receiving electric power from first or second electronic device 200, 300, or both. In a variant, they can also be actively powered devices by the use of a battery, chargeable supercapacitor, or solar panel. Preferably, the passive NFC technology for providing power to sheet 100 can include but is not limited to Radio Frequency Identification (RFID), Ultra High Frequency Radio Frequency Identification (UHF RFID), 13.56 MHZ NFC tag compliance, different types of NFC tags and standards, for example but not limited to international standard ISO/IEC 14443, ISO 15693, Japanese Sony FeliCa standard (JIS X 6319-4), GSMA NFC standards.

As indicated in FIG. 1C, switches 40, 42, 44, 46 that are integrated, embedded, or otherwise provided with sheet 100 can be made as passive switches, for example ones that are in the off-state or non-conducting state when they are not being touched, and provide for a conducting connection between two electrically conducting tracks when a user pushes an area of graphical elements 30, 32, 34, 36. Some details to these types of switches and sheets are discussed in U.S. Patent Publication No. 2020/0125917, this patent publication herewith incorporated by reference in its entirety. As an alternative, switches 40, 42, 44, 46 can be active switches that can sense presence of a finger or other bodily part of the user U, or sensing a device that is handled or worn by user U, for example a capacitive switch, inductive switch, thermally sensing switch, resistance touch switch, piezo touch switch, or other types of body-activatable switches.

Switches 40, 42, 44, 46 can be implemented as two electrodes that are covered with an electrically insulating layer, and a flexible conductive plate placed thereon, the electrically insulating layer having gaps or openings therein, allows a user U to press flexible conductive plate to make electric contact with both electrodes, to thereby make an electric contact. The circuit for reading a status of each switch 40, 42, 44, 46 can include a driver or buffer circuit 96 that is interconnected with first communication chip 12, an exemplary four (4) conductive signal tracks 41, 43, 45, and 47 each leading from driver or buffer circuit 96 to one electrode of the respective switches 40, 42, 44, 46, and a conductive return signal track 49 that returns to driver or buffer circuit 96, for example to be connected to VCC or GND. Upon activating a switch 40, 42, 44, 46 by user U, a circuit formed by one of tracks 41, 43, 45, and 47 and return track 49 is closed, and this signal status change can be available and can be read by NFC chip 12 from driver or buffer circuit 96. It is also possible that driver or buffer circuit 96 is interconnected to NFC chip 22 for reading a status of switches 40, 42, 44, 46, or even interconnected to both NFC chips 12, 22.

As explained above, first communication device 10 that includes antenna 14 and chip 12 can be configured to be entirely passively powered with electromagnetic energy that is provided from first electronic device 200, and similarly, second communication device 12 that includes antenna 24 and chip 20 can be configured to be entirely passively powered with electromagnetic energy that is provided from second electronic device 300, thereby using wireless power transfer (WPT) by using inductive coupling via induced magnetic fields between the NFC antenna from first electronic device 200 and coils from antenna 14 of first communication device 10, and between the NFC antenna from first electronic device 200 and coils from antenna 24 of second communication device 20. In addition, each one of the first and second communication device 10, 20 can also include a high permeability and low loss magnetic sheets to reduce the degradation of antenna gain and radiation efficiency due to generation of eddy currents. While an exemplary embodiment uses a smart phone as first electronic device 200, it is also possible that first electronic device 200 is another type of electronic device that has a display screen 210 and NFC communication capabilities, for example a tablet, a computer, a personal digital assistant, a notebook, a laptop.

With respect to a communication of data from a first electronic device 200 to first communication device 10 with chip 12 of device or sheet 100, in the herewith discussed variant where the first electronic device 200 is a smartphone having a touchscreen display 210, first electronic device 200 can have an application software or firmware installed thereon that can be configured with computer instructions to establish the RF field with his internal NFC antenna to power first communication device 10 of sheet 100. Thereby, RF field will power NFC chip 12 via antenna 14, and chip 12 can be configured to send data back that is stored in NFC chip 12, for example by load modulation using Manchester coding. Thereby first electronic device 200 is operating in the NFC reader mode, with a data exchange by ask and load modulation. This allows first electronic device 200 to access information that can be displayed on a graphical user interface GUI on touch screen 210, for example by the use of a native application software or a web-based application accessible via a browser software installed in a memory of the first electronic device 200 that provides for the GUI allowing to display different types of information. The communication between first electronic device 200 and sheet 100 can be done by typical NFC standards, for example a point-to-point communication using the ISO 13157 standard, ISOIEC 18000-3 standard, at an exemplary bit rate of 424 kbits/sec. Other types of communication protocols and speeds are also possible. In addition, it is possible that application software of first electronic device 200 operates in the NFC writer mode, and not only provides for power to NFC chip 12 via antenna 14, but also writes data to NFC chip 12. For example, data provided by user U to GUI provided by application software of first communication device 200 can thereby be sent to sheet 100. Moreover, during the wireless powering by first electronic device 200, NFC chip 12 can further be configured to perform other computational or communication tasks, for example read status information from switches 40, 42, 44, 46, for example by reading information from driver or buffer circuit 96, and send and receive data from or to NFC chip 22 of the second communication device 20, for example via communication link 90 and the data communication transceivers 95, 97.

Analogously, a communication of data from second electronic device 300 to second communication device 20 with NFC chip 22, in the variant discussed herein being electronic cigarette, second electronic device 300 can have an application software or a firmware installed thereon that can provide for the RF field with his NFC antenna to power second communication device 20 of sheet 100. In turn, the RF field can power second communication device 20 via antenna 24, and with this power, NFC chip 22 can be configured to send data to third communication device 300 that is stored in NFC chip 22, for example by load modulation using Manchester coding. Thereby, second electronic device 300 is operating in the NFC reader mode. In this mode, second electronic device 300 can be configured with new setting values, parameters, and other type of configuration data that is provided to an internal memory of second electronic device 300. In addition, it is possible that application software or firmware of second electronic device 300 operates in the NFC writer mode, and not only provides for power to NFC chip 22 via antenna 24, but also writes data to NFC chip 22, for example to provide data on the current settings or parameters that are stored in a memory of second electronic device 300. Again, the communication between second electronic device 300 and sheet 100 can be done by typical NFC standards, or a proprietary communication standard.

Moreover, second communication device 20 of sheet 100 can also be configured to send and receive data from or to NFC chip 12 of the first communication device 10, for example via communication link 90 and the data communication transceivers 95, 97. In this respect, due to the possibility of both first and second communication devices 10, 20 of sheet 100 to exchange data with each other via communication link 90, it is possible that data on configuration, status, historic setting, or parametrization be sent from third electronic device 300 via sheet 100 to first communication device 200 for displaying and modification on graphical user interface (GUI) of display 210, and that data on configuration, setting, or parametrization be sent from first communication device 200 via sheet 100 to third electronic device 300, while the first and second electronic devices 200, 300 are powering first and second communication devices 10, 20 of sheet 100. For instance, the first and second communication devices 10, 20 may be used to prompt wireless connection and pairing, for example via Bluetooth, between the first electronic device 200 and the second electronic device 300. NFC protocol may thus be only used for the initial communication of a pairing code and connection of first and second communication devices 200, 300, and thereafter, the first and second electronic devices 300 can communicate with each other directly without the use of sheet 100 by a Bluetooth connection. In such case, Bluetooth communication is initiated automatically or at the press of a button by user U via sheet 100 upon placing the first and second electronic devices 200, 300 thereon. In a variant, during the wireless powering from second electronic device 300, NFC chip 22 could also be configured to read status information from switches 40, 42, 44, 46 via a buffer circuit 96, instead or in addition to the reading that can be done by NFC chip 12.

Figure 1E:
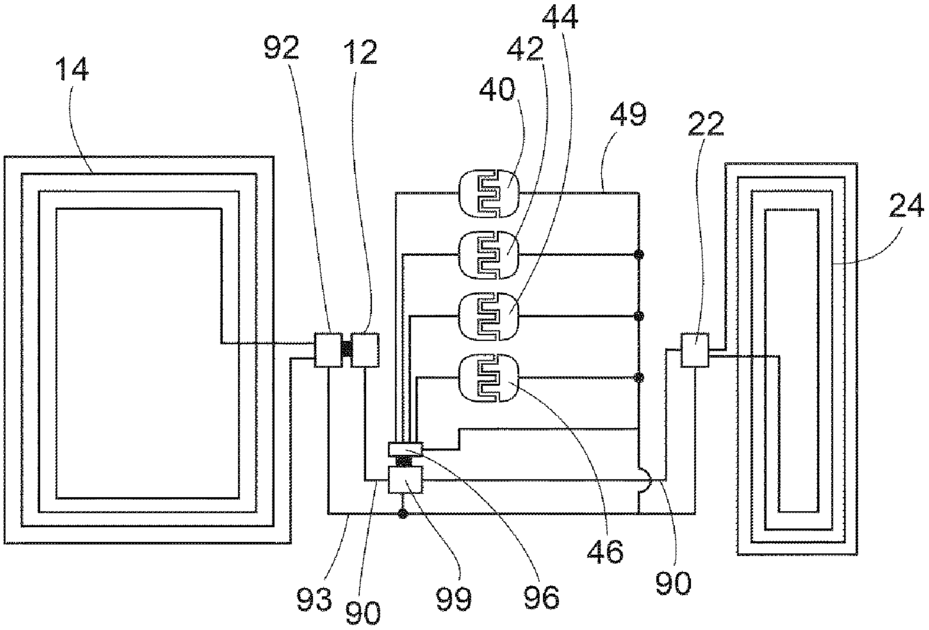

Also, in a variant that is shown in FIG. 1E, it is possible and preferable that both first and second communication devices 10, 20 are wirelessly powered by only one of the NFC antennas from either the first or second electronic device 200, 300, in the variant shown by antenna 14 of first communication device 10 assuming that the smartphone as first electronic device 200 can provide for more power. Thereby, a passive power supply circuit 92 for example including capacitors, matching impedances, voltage regulator, and rectifier can be provided at either the first and second communication devices 10, 20, and a power line 93 could provide for voltage to the different circuits of sheet 100, for example to chips 12, 22, driver 96, and a microcontroller 99. Transceivers 95, 97 and data communication link 90 could also thereby be implemented as an internal bus or serial port between different microprocessors of chips 12, 22. In addition, different types of processor hierarchies could be used, for example one central microcontroller 99 having a data processor, non-volatile memory for the firmware or operation software, and different data ports could be arranged to control and interface with both NFC chips 12, 22, with a data communication link 90 to each NFC chip 12, 22, and with a driver or buffer 96 for reading the state of switches 40, 42, 44, 46 that is associated to centrally-arranged microcontroller 99, or one microcontroller 99 associated with each NFC chips 12, 22, the microcontrollers 99 operatively interfaced with each other via the I2C, SIP, or other types of ports to provide for data communication link 90.

Also, with respect to the representations of FIGS. 1C and 1E, different electronic circuits are shown for NFC chips 12, 22, transceivers 95, 97, data communication link 90, buffer or driver circuit 96, but it is also possible that all of these circuits are integrated into a single module or chip, for example a multi-chip module, or are part of a single chip architecture, for example a microcontroller that can interface to two different NFC antennas 14, 24. While it is preferable that two (2) wireless communication links are provided between NFC chip 12 and first electronic device 200 and between NFC chip 22 and second electronic device 300, preferably by using passive powering by one or two RF fields, data interconnection within sheet 100 between the two NFC chips 12, 22 can be done in various ways as explained above.

Figure 2:
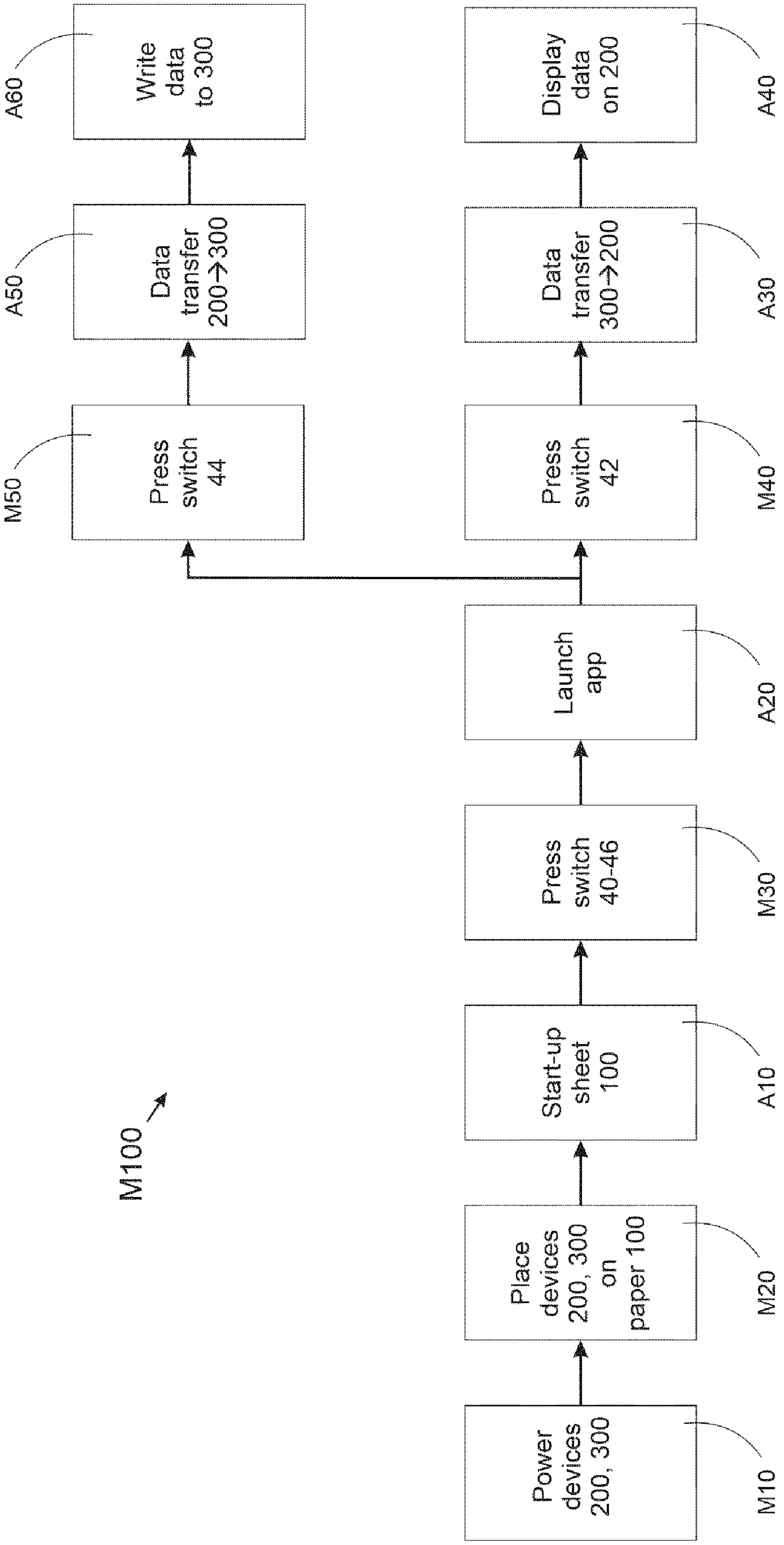
FIG. 2 shows a method M100 of operating the device or sheet 100 together with a first electronic device 200, for example a smart phone, and second electronic device 300, for example an electronic cigarette, showing different steps of the method M100 that allow to communicate between electronic devices 200, 300 via the device or sheet 100, for example a substrate, sheet, paper, card, or foil 100.

According to another aspect of the present invention, an exemplary method M100 for writing or reading information between a first electronic device 200 and a second electronic device 300 is herewith discussed, as shown exemplarily with the flowchart of FIG. 2, by using the sheet 100 described herein. In a step M10 of method M100, both the first and second electronic devices 200, 300 are powered and the NFC communication capability is activated. This can be done by a manual operation by user U. In case of first electronic device 200 being a smartphone, the NFC communication settings can be activated with step M10, for example to allow for NFC communications. However, this could also be the launching of a pre-installed application software that thereby activated NFC communications. In a step M20 of method M100, both electronic devices 200, 300 are placed onto or in close proximity to sheet 100, such that an NFC communication can be established. For example, first electronic device 200, in the example being a smartphone 200, can be placed onto upper surface 101 of sheet 100 at or in proximity of the location of first graphical element 50. Similarly, with step M20, second electronic device 300, in the example being an electronic cigarette 300, can be placed onto upper surface 101 of sheet 100 at or in proximity of the location of second graphical element 60. Step M20 of placing can be also performed before step M10 of establishing power and/or NFC. After step M20 is performed, and with step M10 having been performed, the NFC antenna of the first and second electronic device 200, 300, can provide for power to sheet 100 with the inductive coupling with antennas 14, 24.

Next, with an optional step A10, given that the circuits of sheet 100, for example but not limited to the first and second communication devices 10, 20, can be powered via one or more NFC antennas 14, 24, a firmware or software instructions of sheet 100, for example computer-executable code stored at chip 12, chip 22, or a central microcontroller, microprocessor, or other type of electronic data processing device 99 in a non-volatile memory can be executed by one of the microprocessors associated with at least one of chip 12, chip 22, and microcontroller 99 to start-up and operate sheet 100. This optional start-up procedure by the use of step A10 could verify and check a communication between chips 12, 22, with data communication link 90 and transceivers 95, 97, verify a wireless NFC communication between chip 12 and first electronic device 200, verify a wireless NFC communication between chip 22 and second electronic device 300, performing data integrity checks, checking buffer or driver 96 to check status of switches 40, 42, 44, 46, verifying authenticity of second electronic device 300, for example one being authorized by the distributor of sheet 100, and other start-up and verification tasks. After the optional start-up procedure with step A10, sheet 100 is operated in an idle mode where the status of switches 40, 42, 44, 46 can be repeatedly read, or an interrupt signal of any one of chips 12, 22 or microcontroller 99 can be verified to detect a status change of switches 40-46.

With step M30, user U can press, touch, or otherwise activate one of the switches 40, 42, 44, 46. This signal or change in status can be read by the processor that reads a status of buffer or driver 96, for example NFC chip 12 of first communication device 10, NFC chip 22 of second communication device 20, or microcontroller 99, and NFC chips 12, 22 or microcontroller 99 can cause action with first or second electronic device 200, 300, or both. For example, switch 40 can be pressed by user U, and this change in status can be read by NFC chip 12. Thereafter, for example, NFC chip 12 can wirelessly send a signal or instruction code to first electronic device 200, for example a smartphone, to launch a dedicated application software installed at first electronic device 200. It is also possible that application software of first electronic device 200 is already running, and that the pressing of switch 40 triggers and action at application software, for example a status signal on a graphical user interface indicating a successful interaction and communication with sheet 100, a confirmation signal such as but not limited to a prompt, beep, vibration, status indicator.

Next, with step M40, user U can press, touch, or otherwise activate another one of the switches 40, 42, 44, 46, for example switch 42, that thereafter trigger a data transfer from second electronic device 300, for example an electronic cigarette, via sheet 100 to first electronic device 200 to cause a step A30. For example, after switch 42 has been touched by user U, NFC chip 12 or microcontroller 99 can read such status change from driver or buffer 96, and can trigger performance of step A30 that provides data from device 300 to device 200. Text element 82 that is associated with switch 42 can explain or otherwise indicate that activation of switch 42 reads data from device 300, for example by the text "please press here to view the status of your device."

For this data transfer, NFC chip 12 or microcontroller 99 can send instructions to NFC chip 14 to read data from second electronic device 300. In turn, NFC chip 14 can send instructions to second electronic device 300 to read specific data from device 300. Next, second electronic device 300 can have a firmware or application software that allows to react on or follow the received instruction and can return data to NFC chip 14 in response to the instructions received from NFC chip 14, for example return data that is stored in the memory of device 300. For example, in a case where the second electronic device 300 is an electronic cigarette, the returned information can include status, setting and parameter information of the electronic cigarette 300, for example but not limited to a level of a battery of the electronic cigarette 300, an estimated or measured fill level of a container, pod, or capsule of the electronic cigarette 300, a number of remaining puffs based on the level of the battery of the electronic cigarette 300, a power setting, intensity, and/or temperature values or profile of a heater of the electronic cigarette 300, a total number of puffs performed by the electronic cigarette 300, version information of the electronic cigarette 300, a duration of usage of electronic cigarette 300, and identification information of the electronic cigarette 300, manufacturing or serial number of electronic cigarette 300, firmware version of electronic cigarette 300, brand and make of electronic cigarette 300, manufacturing date, status report or data of electronic device 300.

Moreover, within step A30, upon reception of the data from second electronic device 300 at NFC chip 14, this data can be sent via data communication link 90 to NFC chip 12, and thereafter can be send by NFC chip 12 to first electronic device 200 to be received as data that can be further processed, modified, and displayed by the running application software by a step A40.

With step A40, data that is received from second electronic device 200 can be displayed or otherwise made visual to user U via display device 210, for example by displaying at least a portion of the received data on a graphical user interface GUI on a display 210 of first electronic device 200. Graphical user interface GUI of first electronic device 200 can thereby allow a user U to view or otherwise visualize certain data, or can allow a user U to modify certain data, for example provide for a new heater setting or profile. This can be done via manual or partially automatic editing of the data on the graphical user interface GUI, for example but not limited to touch buttons, sliders, graphical curve modification, uploads.

With step M50, user U can press, touch, or otherwise activate another one of the switches 40, 42, 44, 46, for example switch 44, that thereafter trigger a data transfer from first electronic device 200, via sheet 100 to second electronic device 300. This can step M50 can be done before or after step M40 has been performed, for example after a user U has modified some data that has been received by steps M40, A30, A40 on the graphical user interface GUI of first electronic device 200. In an example, a user U wants to upload new settings for second electronic device 300, being an electronic cigarette 300. Text element 84 associated with switch 44 can thereby show or explain that an upload of new data can be performed by activating switch 44. As an example, after step M50 where user U has touched switch 44, with step A50, an instruction and data can be wirelessly sent from first electronic device 200 to NFC chip 12 of first communication device 10. Thereafter NFC chip 12 can read the received instruction and can thereafter send along the received data, or a portion thereof, to NFC chip 22 of second communication device 20, by the use of data communication link 90 and transceivers 95, 97 within sheet 100. Data received at NFC chip 22 can then be wirelessly send to second electronic device 300. With a step A60, second electronic device 300 can be operated with a firmware or application software instructions to receive the data, and to write the data, or a portion thereof, to a local memory, to thereby install new setting or parameters for the operation of second electronic device 300.

In another example, with steps M50, A50, and A60, a button or switch 40, 42, 44, 46 can be pressed or otherwise activated, that leads to a firmware update of second electronic device 300. This can be indicated by a text message with one of graphical elements 80, 82, 84, 86. For example, upon pressing switch 46, it is possible that chip 12 sends a code or information back to first electronic device 200, and the application software running of first electronic device 200 can thereafter download a new firmware version for second electronic device 300 from an internet connection. Thereafter, the new firmware can be sent wirelessly from first electronic device 200 to NFC chip 12, from NFC chip 12 via data communication link 90 to NFC chip 14, and from NFC chip 14 to second electronic device 300, for example an electronic cigarette 300. Second electronic device 300 can have an application software or kernel that can verify authenticity of the new firmware before installing it locally on a non-volatile memory.

Other types of functionalities could be called or invoked by the pressing, touching or otherwise activating switches 40, 42, 44, 46, for example specific requesting of a video tutorial or presentation on how to operate second electronic device 300, for example to triggering of an auditive, visual, or audiovisual presentation on aspects of use of second electronic device 300, for example a tutorial on how to insert a new pod or capsule to electronic cigarette 300, for example by an audiovisual presentation that is started within a pop-up screen after pressing, touching, or otherwise activating a switch 40, 42, 44, 46, presented on the graphical user interface GUI on display 210 of first electronic device 210, requesting the setting of a specific or generic user profile that can be configured on first electronic device 200 and thereafter uploaded and installed to second electronic device 300. Also, pressing, touching or otherwise activating switches 40, 42, 44, 46 of sheet 100 can open a webpage on first electronic device 200, or start other types of applications. It also possible that pressing, touching or otherwise activating switches 40, 42, 44, 46 of sheet 100 allow to perform actions that are performed on second electronic device 300, for example but not limited to performing an integrity check within device 300 that results in a blinking of status LED or other type of indicator after the check, performing a dry puff with electronic cigarette as second electronic device 300, setting locking or unlocking status of electronic device 300, for example to disable or enable user operations of via a button or touch element of electronic device 300, change different types of setting or user profiles of electronic device 300, for example changing a power mode, a power profile, or other type of power setting, increase or decrease a heating temperature or heating power of electronic device 300, performing a check of the battery status, setting a LED signal light intensity, LED signal light color, flashing pattern of the LED signal light, vibration patterns, intensity, or duration of a vibratory signal of electronic device 300, or providing or a parameter setting of any other active electronic element of electronic device 300, for example settings or parameters to control active electronic elements that could be arranged with electronic device 300 such as but not limited to LEDs, displays, motors, heaters, pumps, valves, atomizers, image sensors, microphones, vibratory signal devices, speakers, injectors, dispensers, input buttons.

As another example, pressing, touching, or otherwise activating a switch 40, 42, 44, 46 of sheet 100 can link the specific second electronic device 300 to a user profile, for example a user profile including different information on the user, including but not limited to gender, age, inhalation habits related to an electronic cigarette, for example by linking a serial number or other unique identification of second electronic device 300 to an unique identification or code of a user profile. Thereby it is possible to perform an age-verification of the individual that is associated with the user profile, for example in a case where a user has been identified or logged in to a portal, that has used an age-verification process of the user or individual. Data of different user profiles can be made electronically available or otherwise accessible from first electronic device 200, for example with an application software that can access locally stored user profiles, or can access the user profiles from a cloud or other remote database. In this respect, the pressing of one of switches 40, 42, 44, 46 could read a serial number or other unique identification code from second electronic device 300, transfer via second communication device 20, communication link 90, and first communication device 10, to make the unique identification code of device 300 available at first electronic device 200. In addition, sheet 100 itself can have an unique identification code associated therewith, for example in a non-volatile memory that can be accessed by microcontroller 99, or one of NFC communication chips 12, 22, that can also allow to link sheet 100 with a user profile, together with second electronic device.

In this respect, for example after pressing one of switches 40, 42, 44, 46 to start up a software application at first electronic device 200, for example being a smart phone, user U can press another one of switches 40, 42, 44, 46 to perform an user profile linking process, where the unique identification code of second device 300 is read and transferred to first electronic device 200, and thereafter, application software writes the received data of the unique identification code into a data field of the user profile, or a separate data structure for linking the unique identification code with the user profile. For this purpose, it may be possible that user U logs himself into an account at a data service that include data of his or her user profile. This could also include an age verification process, where second electronic device 300, for example an electronic cigarette, can be disabled or otherwise locked if the age verification process is not passed successfully. Also, a warning prompt or window can be generated on the GUI of first electronic device 200. The age verification could be done by the application software accessing different types of third-party age verification services, for example by using age verification application programming interface (API) or other type of web-based age and identify verification software or service. In addition, it would be possible to make an authentication check of second electronic device 300, for example by using the unique identification code of second electronic device 300 to access an authentication database via the application software of first electronic device 200. Upon linking the unique identification code of device 300 with a user U, for example via his user profile, different pre-stored device settings can be uploaded from a user profile database, via electronic device 200, sheet 100, into second electronic device 300, for example upon pressing one of switches 40, 42, 44, 46, so that the second electronic device 300 can be configured based on a pre-stored setting profile.

Figure 3:
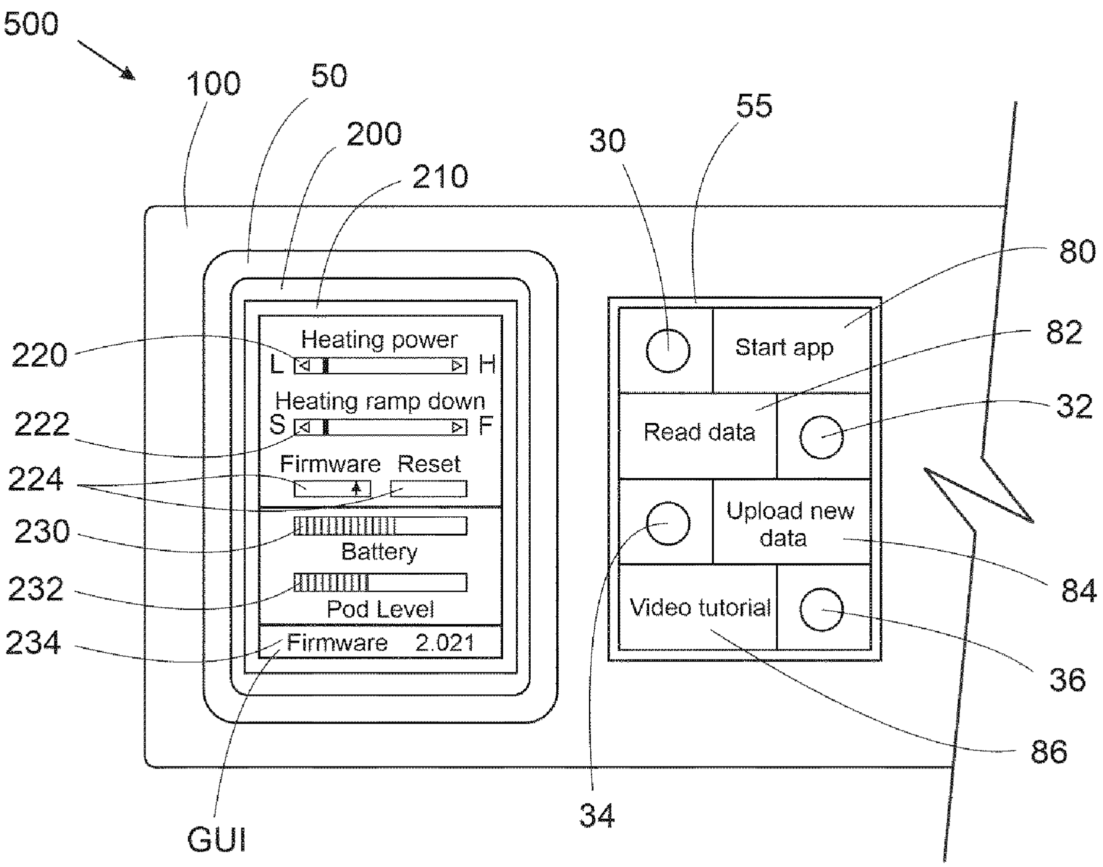
FIG. 3 shows a top view of an exemplary graphical user interface GUI on screen 210 of first electronic device 200 that is placed onto device or sheet 100, for example a smartphone or other electronic device with a display 210, showing parameters, status or setting information that are displayed, and allowing the modifying of certain parameters of first electronic device 200 via a GUI.

FIG. 3 shows a top view of an exemplary graphical user interface GUI on screen 210 of second electronic device 200 that is placed onto device or sheet 100, showing parameters or setting that are displayed, and allowing for modifying certain parameters or settings of second electronic device 200. This GUI can be part of the application software that was launched after a user U has pressed one of switches 40, 42, 44, 46 of sheet 100, for example with steps M30, A20 of method M100. For the launching of an application software or app on first electronic device 200 with step A20, typically a smartphone that is running an operating software such as Android, IOS, Windows Phone, Linux, Symbian OS, or other type of mobile operating system, a setting of the operating system of the smartphone 300 could be such that a direct or indirect activation of an application software by a NFC code that is received from first communication device 10, for example the NFC communication chip 12, is possible. For example, upon detection of an NFC code by NFC communication interface of smartphone 300, a prompt or window on the GUI on display 210 can be created, requesting permission from user U to allow the application software to start or launch, or even a direct launch of application software upon detection of a corresponding NFC code. In this respect, the NFC communication should be enabled at smartphone 300 for allowing such type of communication between first electronic device 300 and sheet 100. Different types of NFC communication data could be used, for example codes based on the NFC data exchange format (NDEF) standard, for example using NDEF messages, and using the tag dispatch system of the operating system, to allow the starting or launching of an application software on smartphone 300.

As an example of a GUI of the launched application, in an exemplary upper section of the GUI that is provided by the application software on display 210 of first electronic device 200, user-modifiable parameters or settings can be presented, the displayed data having been read or sent from second electronic device 300 and transmitted via sheet 100 to first electronic device 200, for example by steps M40, A30, A40. For example, a graphically-represented slider 220 can be displayed allows to increase or decrease a heating power of heating coil of electronic cigarette 300, allowing the user U to change the value by the use of buttons, or finger-actuation via a touch screen, a graphically-represented slider 222 can be displayed that allows to increase or decrease a hating ramp down time of heating coil of electronic cigarette 300, and different buttons 224 can be presented on GUI of display 210, for example to force a firmware update of electronic cigarette 300, or to provide for other settings, for example to enable or disable any beep or light signals, or to provide for other types of settings and parameters to electronic cigarette. The user-modified parameters can then be uploaded to electronic cigarette 300 with steps M50, A50, A60.

In the lower section of GUI, as an example, it is possible that different status information or data of electronic cigarette 300 of other types of electronic device 300 is represented, for example status information that was read from second electronic device 300 with steps M40, A30, A40 for example but not limited to a battery level with a fill bar or progress bar 230, for example an estimated or measured liquid level of pod, container, or capsule that is currently attached to electronic device 300 with fill bar 232, an result of an electric or mechanical integrity check, a status information whether the pod, capsule, or container is properly connected to electronic cigarette 300, information on available memory space, and other data can be displayed, for example but not limited to the firmware version, product name and version, or other data mentioned herein. This data can be read-only, and cannot be modified by user U with GUI.

Figure 4:
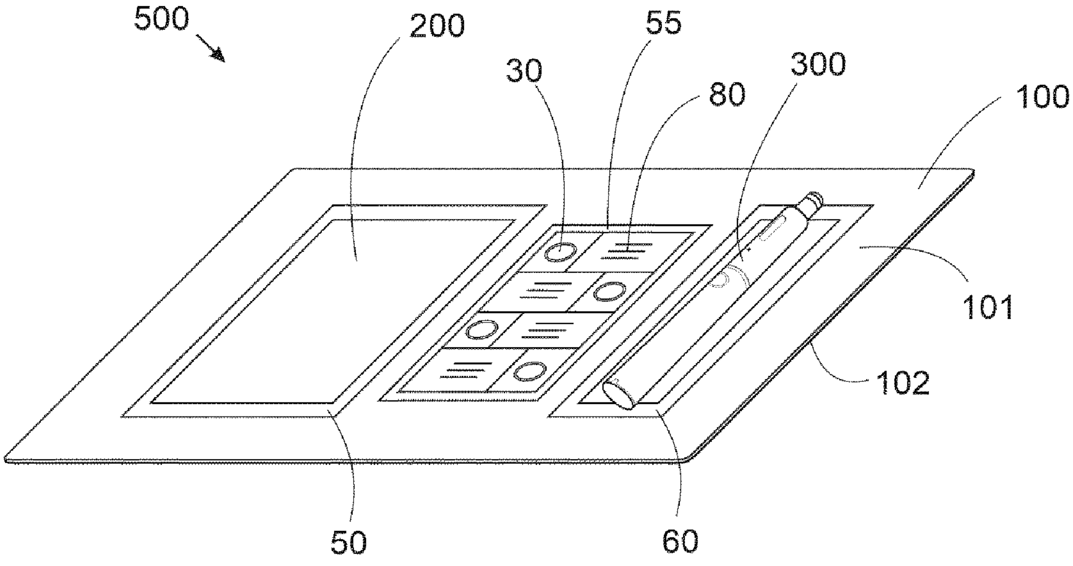
FIG. 4 shows a view similar to that of FIG. 1A, depicting an alternative exemplary embodiment of an electronic device 100 and system 500 according to an aspect of the invention. Electronic device 100 is exemplarily embodied as a substrate, sheet, paper, card, or foil 100 and includes a first and second communication device 10, 20 for wirelessly connecting to different electronic devices 200, 300, respectively, for example to a first electronic device 200 such as a smart card (such as a NFC-enabled card, for example an ATM or ID card), and to a second electronic device 300, for example an electronic aerosol-generation device such as an electronic cigarette or Heat-not-burn device, placed thereon.

In a further example represented by FIG. 4, according to another aspect of the present invention, it is possible to provide for simpler authentication and/or age verification process of a user of the second electronic device 300 with system 500, that can be carried with the use of an NFC-enabled smart card as first electronic device 200, such as an ATM card or ID card with user's identity and age stored or recorded in an embedded NFC-tag comprised in the card. Thereby, a method for age- and/or user-authentication or verification of a user can be performed by the use of system 500, for example before the device 300 is used. Such a method is particularly advantageous as it only needs the second electronic device 300 to be an active NFC constituent of the system 500 and does not necessarily require any display-featuring smart device such as a smart phone for first electronic device 200 at all to perform initial setup of the second electronic device 300, in particular for user authentication and age verification.

Data that is related to or associated to a specific user U can be stored in an NFC-enabled smart card such as an ATM or ID card as first electronic device 200 and made electronically available or otherwise accessible over NFC via sheet 100 and its communication devices 10, 20 to the second electronic device 300, when both are placed on or in the vicinity of communication devices 10, 20. For example, the data can include the age of a user, that thereby can extracted from the memory of smart card 200 and verified or authenticated by second electronic device 300 to unlock one or more functionalities of second electronic device 200 to allow safe use by the user. In this respect, the pressing of one of switches 40, 42, 44, 46 could read data including the user's authentication and/or age information of the user from first electronic device 200, transfer the data via first communication device 10, communication link 90, and second communication device 20 to second electronic device 300, to unlock one or more functionalities of second electronic device 300. For example, this feature could allow the unlocking of the vaping, heating, or other type of atomizing or aerosol generation of a tobacco product by second electronic device 300, could allow the unlocking of vaping, heating, or other type of atomizing or aerosol generation of a tobacco product with a higher nicotine content or longer combustion or heating duration that would not be allowed without user verification or authentication, or could allow the unlocking of uses of other types of vaping or inhalation of consumables.

Moreover, according to another aspect of the present invention, with system 500 it is also possible to perform a multifactor authentication or verification method, for example by first verifying data of the user from smart card as first electronic device 200, and thereafter performing a biometrical or other type of user verification or authentication by a smart phone used as another first electronic device 200. The authentication or verification itself can be performed by the application of smart phone, to thereafter transmit an authentication result to electronic device 300, or could also be performed by a data processor of electronic device 300, after receiving data of from the smart card and data of the authentication from smart phon. This could be done by first placing the smart card to sheet 100 at area of first graphical element 50 for transmitting the data of the user to second electronic device 300, for example the age or other personal information, and thereafter placing the smart phone to area of graphical element 50 for transmitting data of an earlier performed biometrical authentication to second electronic device 300, for verifying a match between the data of smart card and the identity of the user. In addition, the SIM card of smart card can be used for additional authentication or verification purposes.

Figure 5A:
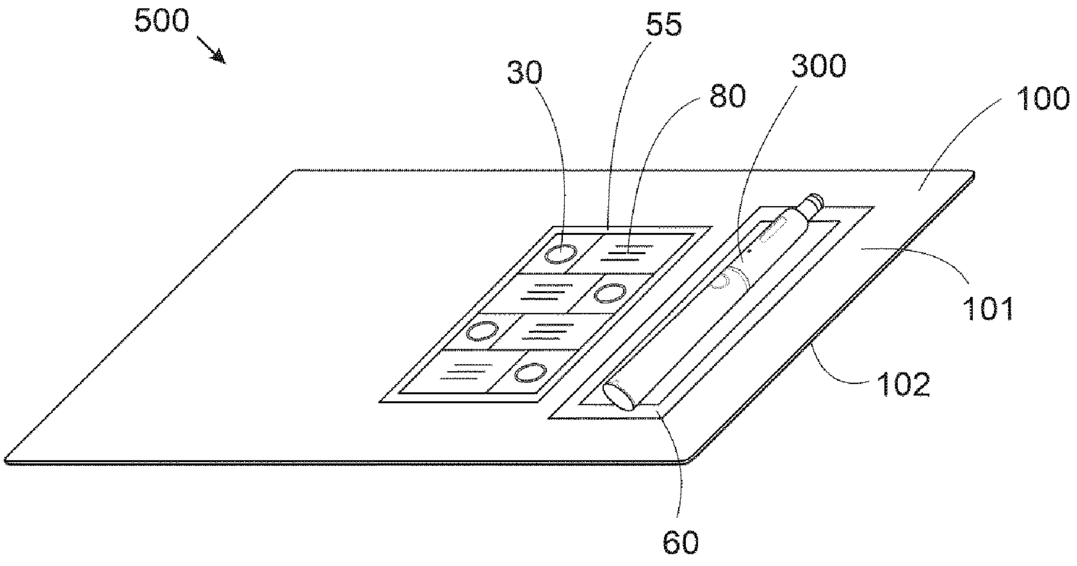
FIGS. 5A and 5B show views like those of FIGS. 1A and 1B of an alternative exemplary embodiment of an electronic device 100 and system 500 according to another aspect of the invention. Electronic device 100 is again exemplarily embodied as a substrate, sheet, paper, card, or foil 100 and includes a first communication device 10 having non-volatile memory for storing data and a second communication device 20, for wirelessly connecting to an electronic device 300, for example an electronic aerosol-generation device such as an electronic cigarette or Heat-not-burn device, placed thereon, the electronic device 300 being wirelessly configurable via the second communications device based on data stored in the memory of the first communication device 10.
Figure 5B:
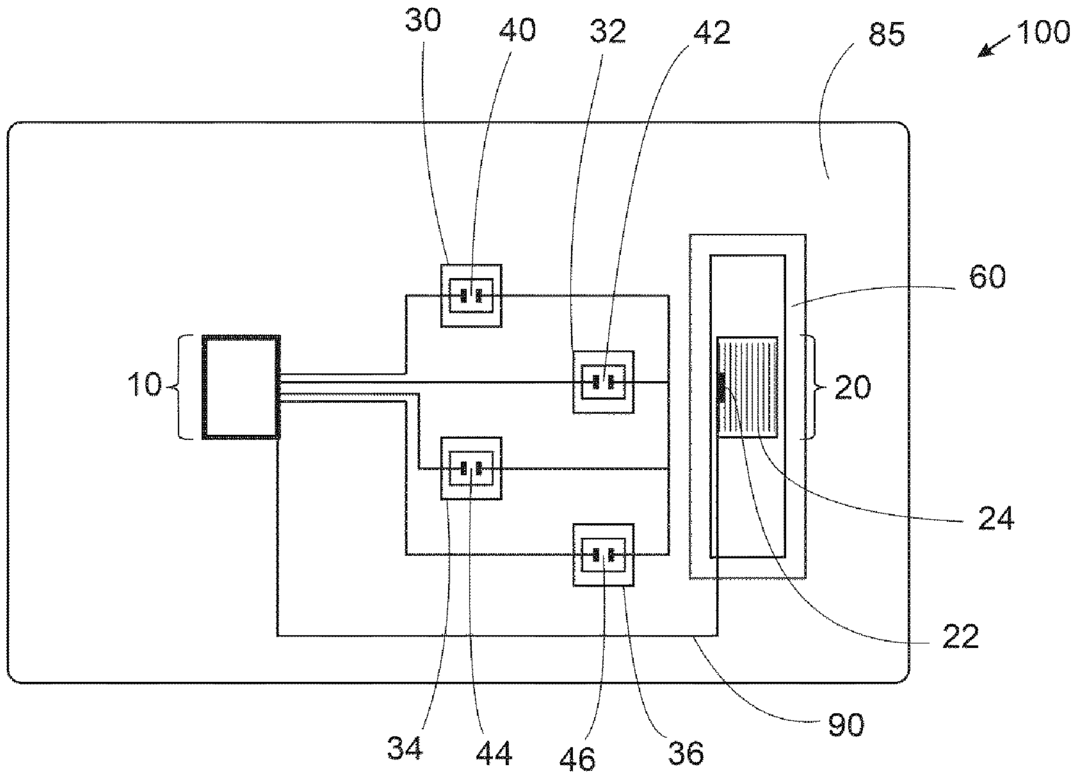

A further example of an electronic device 100 and system 500 according to still a further embodiment of the invention is represented in FIGS. 5A and 5B. These figures depict a simple implementation of an electronic sheet 100 to carry out initial configuration of a single electronic device 300 such as an aerosol-generating device, represented here in FIG. 5A as an e-cigarette. As shown in FIG. 5A an exemplary top perspective view of the device or sheet 100 is provided, for example a printed sheet, paper, card, or foil, or film 100 with an electronic device 300, for example an electronic aerosol-generation device 300 such as but not limited to an electronic cigarette or Heat-not-burn device, placed at a specific location on an upper surface of device 100 on a graphical element 60 can to guarantee the possibility of a wireless or contactless communication between the electronic device 300 and device or sheet 100.

In addition, another graphical element 55 is arranged, as shown in the other embodiments, including graphical elements 30, 32, 34, 36 representing different areas for activation of a push or sensing button or switch 40, 42, 44, 46, respectively. Moreover, for example being part of third graphical element 55, different descriptive or informative graphical elements are shown, for example text element 80 viewable on the front surface 101 of sheet 100. As previously described, such text element 80 can be visually or graphically associated with the at least one switch elements 40, 42, 44, 46 to provide for a description, instruction, or context for a user U that is associated with an action that will be performed when user U activates a respective one of switch elements 40, 42, 44, 46. Reference is made to the earlier description in relation to FIGS. 1A to 1E for the further technical features and combinations thereof relating to graphical elements 55, 60 and any one of the text element 80.

FIG. 5B shows a simplified, exemplary view of the electronic circuitry of the device 100 in this simplest embodiment. It is basically identical to the exemplary embodiment of FIGS. 1A-1E, but for the provision of a first communication device 10 in the form of a non-volatile readable memory, the memory configured for storing configuration data of the electronic device 300, serving as an integrated or embedded and non-removable data storage for holding different types of configuration or parametrization data for electronic device 300. First communication device 10 is operatively interconnected with a data communication link 90, for example including a data communication transceiver that is operatively interconnected with an NFC communication chip 22 and NFC antenna 24 of the second communication device 20. Data communication link 90 and the transceiver can use different types of data protocols and transmission modes, for example but not limited to a Universal Serial Bus (USB), I2C, CAN bus, RS-232, RS-485, Firewire IEEE 1394, TTL signals, Serial Peripheral Interface (SPI). Preferably, the transmission mode of transceiver and data communication link 90 is a wired connection using very low power consumption. The NFC communication chips 22 and antenna 24 is preferably operated passively, being fed with wireless power from the aerosol-generating device 300 via inductive coupling, for example by the use of a loop antenna 24 forming an air-core transformer. In a variant, they can also be actively powered devices by the use of a battery, chargeable supercapacitor, or solar panel. Preferably, the passive NFC technology for providing power to sheet 100 can include but is not limited to Radio Frequency Identification (RFID), Ultra High Frequency Radio Frequency Identification (UHF RFID), 13.56 MHZ NFC tag compliance, different types of NFC tags and standards, for example but not limited to international standard ISO/IEC 14443, ISO 15693, Japanese Sony FeliCa standard (JIS X 6319-4), GSMA NFC standards.

As indicated in relation to FIG. 1C, switches 40, 42, 44, 46 that are integrated, embedded, or otherwise provided with sheet 100 can be made as passive switches, for example ones that are in the off-state or non-conducting state when they are not being touched, and provide for a conducting connection between two electrically conducting tracks when a user pushes an area of graphical elements 30, 32, 34, 36. Some details to these types of switches and sheets are discussed in U.S. Patent Publication No. 2020/0125917, this patent publication herewith incorporated by reference in its entirety. As an alternative, switches 40, 42, 44, 46 can be active switches that can sense presence of a finger or other bodily part of the user U or sensing a device that is handled or worn by user U, for example a capacitive switch, inductive switch, thermally sensing switch, resistance touch switch, piezo touch switch, or other types of body-activatable switches.

Switches 40, 42, 44, 46 can be implemented as previously described in relation to FIG. 1C.

First communication device 10 is configured to be entirely passively powered with electromagnetic energy that is provided from the electronic device 300. A communication of data from second electronic device 300 to second communication device 20 with NFC chip 22. Preferably, the electronic device 300 can have an application software or a firmware installed thereon that can provide for the RF field with his NFC antenna to power second communication device 20 of sheet 100. In turn, the RF field can power second communication device 20 via antenna 24, and with this power, NFC chip 22 can be configured to read and send data stored in the memory of the first communication device 10 over the communication link 90 to the NFC chip 22, for example by load modulation using Manchester coding. Thereby, the electronic device 300 is operating in the NFC reader mode. In this mode, the electronic device 300 can be easily configured after purchase before first use by a user, simply placing the aerosol-generating device 300 on the sheet 100 and by pressing one of the buttons/switches 40, 42, 44, 46 trigger configuration of the electronic device 300 with particular setting values, parameters, and other type of configuration data that is provided to a memory of the electronic device 300 to allow a user to use it after purchase.

The herein presented device or sheet 100, system 500 including sheet 100, or method M100 of using device or sheet 100, it is possible to provide for a printed marketing medium in the form of device or sheet 100, for example a promotional sheet, marketing leaflet, marketing flyer, or other type of marketing or sales medium, that allows a user U to use certain user interface functionalities of his smartphone as the first electronic device 200 and his electronic cigarette as the second electronic device 300, by pressing onto printed areas of the sheet 100. Device or sheets 100 can be provided to potential, first time, or existing customers, to be guided by a printed medium in collaboration with electronic devices 200, 300 to gain a first user experience or product walk through. This allows to facilitate different types of user operations and manipulations to second electronic device 300, that may not have been possible solely with limited user interface features of second electronic device 300. In addition, it allows to facilitate communication to sales prospects, potential and existing clients, and allows to provide for an easy understandable and interactive guide to a specific type of electronic device 300. The device or sheet 100, system 500, and method M100 is particularly useful for second electronic devices 300 that have limited or no user data input or output functionality, for example electronic device 300 that are too small to provide for meaningful or fully-operational user data input and output devices, for example devices having a small or no display screen, different types of portable electronic devices (PED), for example with no or limited user data input device in the form of buttons, touchscreens, or menus, such as but not limited to electronic cigarettes, smart watches, action cameras, photo cameras, pacemakers, electric shavers, electric toothbrushes, hearing aids, headphones, electronic toys, music players, smart cards, electronic keys. Also, such sheet 100, for example a sheet 100 that is paper- or cardboard-based or has a paper-like feel, can provide for a user interface of a printed medium for consumers who still prefer to read or otherwise gather information from printed paper and not from touchscreens. In this respect, a user or customer can use sheet 100 right after purchase of a new electronic device 300, and can use sheet 100 to perform initialization or setting up of electronic device 300, and can unlock or activate specific features of electronic device 300. Herein, the example of second electronic device 300 being an electronic cigarette has been used, but other types of portable electronic devices as enumerated above can also be possible. Also, paper or sheet 100 can be made for one time use, and can be made of mostly recyclable materials, not having any batteries, and using conductive tracks, for example tracks 41, 43, 45, 47, 49 or switches 40, 42, 44, 46 that can be mode of biodegradable polymeric materials used for degradable electronics.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments, and be given the broadest reasonable interpretation in accordance with the language of the appended claims.

The invention claimed is:

1. A sheet having a front surface and a rear surface, the sheet configured for linking a first electronic device having a user interface with a second electronic device, the sheet comprising:

- a first communication device for wirelessly connecting to the first electronic device;
- a second communication device for wirelessly connecting to the second electronic device;
- at least one switch element operatively connected to the first communication device or the second communication device; and
- a bidirectional data communication link between the first communication device and the second communication device, wherein the bidirectional communication link between the first communication device and the second communication device is configured to transfer an initial pairing code between the first electronic device and the second electronic device.

2. The sheet according to claim 1, further comprising:

a first graphical element viewable on the front surface of the sheet, the first graphical element configured to indicate an area for placing the first electronic device onto the sheet;

a second graphical element viewable on the front surface of the sheet, the second graphical element configured to indicate an area for placing the second electronic device onto the sheet; and a third graphical element viewable on the front surface of the sheet for indicating an area for activating the at least one switch element.

3. The sheet according to claim 2, further comprising:

a text element viewable on the front surface of the sheet, the text element visually associated with the at least one switch element.

4. The sheet according to claim 1, wherein the sheet includes conductive tracks, the conductive tracks providing for interconnection between the at least one switch element and the first communication device or the second communication device.

5. The sheet according to claim 1, wherein the first communication device includes an NFC antenna and an NFC chip, and the second communication device includes an NFC antenna and an NFC chip.

6. A system comprising the sheet according to claim 1, the system further comprising a first electronic device, wherein the first electronic device includes a smart phone having a display screen.

7. The sheet according to claim 5, wherein one of the at least one switch element is configured to close an electric circuit formed between the one switch element and the NFC chip of the first communication device or the NFC chip of the second communication device upon pressing or otherwise activating the one switch element.

8. The sheet according to claim 7, wherein upon pressing or otherwise activating the one switch element, the first communication device is configured to send a first instruction to the second communication device via the data communication link after receiving data from the first electronic device, and the second communication device is configured to send a second instruction to the second electronic device.

9. The sheet according to claim 7, wherein upon pressing or otherwise activating the one switch element, the first communication device is configured to send a first instruction to the second communication device via the data communication link, and the second communication device is configured to send a second instruction to the second electronic device to receive data from the second electronic device.

10. The sheet according to claim 9, wherein the NFC chip of the second communication device is configured to read status information from the second electronic device.

11. A system comprising the sheet according to claim 10, the system further comprising a second electronic device, wherein the second electronic device includes an electronic cigarette, and wherein the status information includes at least one of a level of a battery of the electronic cigarette, a fill level of a container of the electronic cigarette, a number of remaining puffs based on the level of the battery of the electronic cigarette, a power setting of a heater of the electronic cigarette, a total number of puffs performed by the electronic cigarette, version information of the electronic cigarette, or identification information of the electronic cigarette.

12. The sheet according to claim 5, wherein the NFC chip of the second communication device is configured to send parameter information to the second electronic device, the parameter information configuring an operation of the second electronic device.

13. The sheet according to claim 5, wherein the NFC antenna of the first communication device is configured to receive electric power from an NFC antenna of the first electronic device, or the NFC antenna of the second communication device is configured to receive electric power from an NFC antenna of the second electronic device, or both the NFC antennas and are configured to receive electric power from both the first and second electronic devices.

14. A system comprising:

a sheet having a front surface and a rear surface;

a first electronic device having a display, and a second electronic device, wherein the sheet includes:

a first communication device for wirelessly connecting to the first electronic device;

a second communication device for wirelessly connecting to the second electronic device;

at least one switch element operatively connected to the first communication device or the second communication device; and a data communication link between the first communication device and the second communication device, and wherein the data communication link between the first communication device and the second communication device is configured to transfer an initial pairing code between the first electronic device and the second electronic device.

15. A method for writing or reading information between a first electronic device and a second electronic device via a sheet, the sheet having a first communication device for wirelessly connecting to the first electronic device, a second communication device for wirelessly connecting to the second electronic device, and a data communication link for communicating between the first and second communication devices, the method comprising the steps of:

placing the first and second electronic devices onto the sheet;

pressing a switch of the sheet to launch an application software on the first electronic device via the first communication device;

pressing a switch of the sheet to trigger a data transfer from the first electronic device to the second electronic device via the data communication link, or pressing a switch of the sheet to trigger a data transfer from the second electronic device to the first electronic device via the data communication link, wherein the triggered data transfer transfers an initial pairing code between the first electronic device and the second electronic device.

16. A sheet having a front surface and a rear surface, the sheet configured for wirelessly linking to at least one electronic device, the sheet comprising:

a first communication device and a second communication device, at least one of the first or second communication devices being configured for wirelessly connecting to the at least one electronic device;

at least one switch element operatively connected to the first communication device or the second communication device; and a bidirectional data communication link between the first communication device and the second communication device, wherein the bidirectional communication link between the first communication device and the second communication device is configured to transfer an initial pairing code between the first communication device and the second communication device.

17. The sheet according to claim 16, configured for linking a first electronic device with a second electronic device, wherein both the first and second communication devices include an NFC antenna and a NFC chip.

18. A system comprising the sheet according to claim 17, the system further comprising a first electronic device, wherein the first electronic device is a passive NFC-enabled device.

19. The sheet according to claim 17, wherein one of the at least one switch element is configured to close an electric circuit formed between the one switch element, and the NFC chip of the first communication device or the NFC chip of the second communication device upon pressing or otherwise activating the one switch element, and wherein upon pressing or otherwise activating the one switch element, the first communication device is configured to send a first instruction to the second communication device via the data communication link after receiving data from the first electronic device, and the second communication device is configured to send a second instruction to the second electronic device.

20. The system according to claim 18, wherein each NFC antenna is configured to receive electric power from an NFC antenna of the second electronic device.

* * * * *